C. RUIZ.
FRACTION ADDING MACHINE.
APPLICATION FILED AUG. 7, 1917. RENEWED MAR. 24, 1920.

1,344,190.

Patented June 22, 1920.

INVENTOR
Carlos Ruiz
Louis M. Schmidt
ATTORNEY

C. RUIZ.
FRACTION ADDING MACHINE.
APPLICATION FILED AUG. 7, 1917. RENEWED MAR. 24, 1920.

1,344,190.

Patented June 22, 1920.
5 SHEETS—SHEET 2.

INVENTOR
Carlos Ruiz
Louis M. Schmidt
ATTORNEY

C. RUIZ.
FRACTION ADDING MACHINE.
APPLICATION FILED AUG. 7, 1917. RENEWED MAR. 24, 1920.

1,344,190.

Patented June 22, 1920.

INVENTOR.
Carlos Ruiz
Louis M. Schmidt
ATTORNEY.

C. RUIZ.
FRACTION ADDING MACHINE.
APPLICATION FILED AUG. 7, 1917. RENEWED MAR. 24, 1920.

1,344,190.

Patented June 22, 1920.
5 SHEETS—SHEET 5.

INVENTOR
Carlos Ruiz

Louis M. Schmidt
ATTORNEY

UNITED STATES PATENT OFFICE.

CARLOS RUIZ, OF HARTFORD, CONNECTICUT.

FRACTION-ADDING MACHINE.

1,344,190.   Specification of Letters Patent.   Patented June 22, 1920.

Application filed August 7, 1917, Serial No. 184,846. Renewed March 24, 1920. Serial No. 368,374.

*To all whom it may concern:*

Be it known that I, CARLOS RUIZ, a subject of the King of Spain, residing at Hartford, in the county of Hartford and State of Connecticut, have invented certain new and useful Improvements in Fraction-Adding Machines, of which the following is a specification.

My invention relates to improvements in fraction adding machines, and the object of my improvement is to produce a machine in convenient form for handling and operating and that is adapted for adding the fractions that are in common use as the subdivisions of the inch of English measure.

In the accompanying drawing:—

Figure 1:
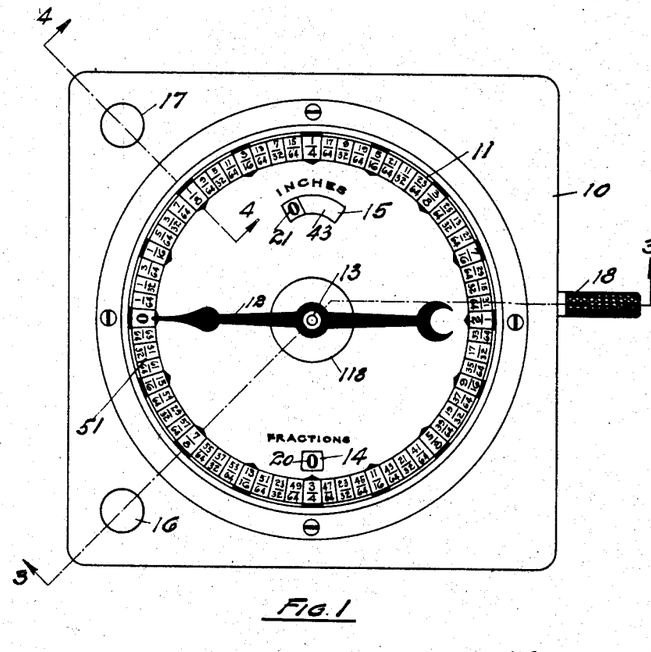
Figure 1 is a plan view of my improved fraction adding machine.
Figure 2:
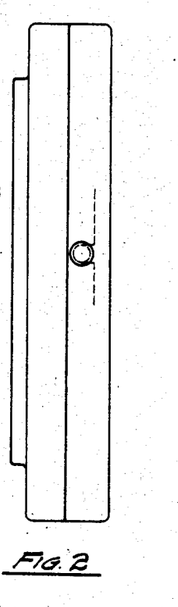
Fig. 2 is an end elevation of the same.

My improved fraction adding machine comprises as viewed from the exterior a frame or base 10 of square form and moderate thickness; having on the upper face a circular dial 11; an index finger 12 for coöperating with the said dial 11 supported by a shaft 13 at the middle of the dial 11; a pair of sight openings within the dial space, comprising an opening 14 that is positioned at the lower side of the axis when in the normal position for use and a second opening 15 in the form of a slot that is concentric with the axis that is positioned on the upper side of the axis; a pair of push-buttons, comprising a push-button 16 at the lower left hand corner and a second push-button 17 at the upper left hand corner; and a handle 18 that extends laterally to the right beyond the adjacent end wall of the casing 10.

The dial 11 is graduated into sixty-fourths and has markings from 0 to 63/64, the zero marking being at the left, on the line of the left horizontal radius, and the direction of the markings is clock-wise.

The lower sight opening 14 is on the line of the lower vertical radius and is of a size to show a single figure, such as the zero indicated by the character 20 or a fractional character.

The sight opening 15 is positioned on the line of the other or upper vertical radius, being symmetrically positioned relatively thereto, has a height or radial depth suitable for showing a single figure, such as the zero indicated by the character 21, and circumferentially is of about double the extent necessary to display a single figure or character 21 for reasons that will appear later from the description.

The handle 18 is positioned just above or in off-set relation to the horizontal diameter of the dial 11 as a convenience from a construction standpoint as will appear later from the description, and is of cylindrical, rod-like form, with a knurled exterior for the grip portion, and extends outwardly a suitable distance to be conveniently grasped by the fingers and thumb of the right hand.

Normally the conditions existing are as follows:—The index 12 is directed toward the left at the zero marking of the dial 11; at the lower display opening 14 the zero marking 20 is displayed; and at the upper display opening 15, which as mentioned is in the form of a slot, the zero marking 21 is displayed at the left side of the said slot 15.

Operatively, the device presents the following features:—With the parts in the normal position described the device is placed in a convenient position for use, being either held in the left hand or steadied while resting on a table, and the handle 18 is rotated on its axis to bring index 12 to the marking to correspond to the fraction it is desired to use in the summing or addition. Initially, with the index 12 at zero, such rotation can be effected in one direction only, due to the construction and operation of the internal mechanism, and in fact no motion is possible back of zero, and such motion is furthermore limited to one complete rotation.

That is to say, all the movement permitted the index 12 is in the field in the clock-wise directed side of zero, and then only up to zero.

This signifies that it is possible to make precisely one complete revolution of the index and no more, and one of the special features of the mechanism to be described is the means for permitting this result to be obtained, involving the use of special stop mechanism.

Figure 3:
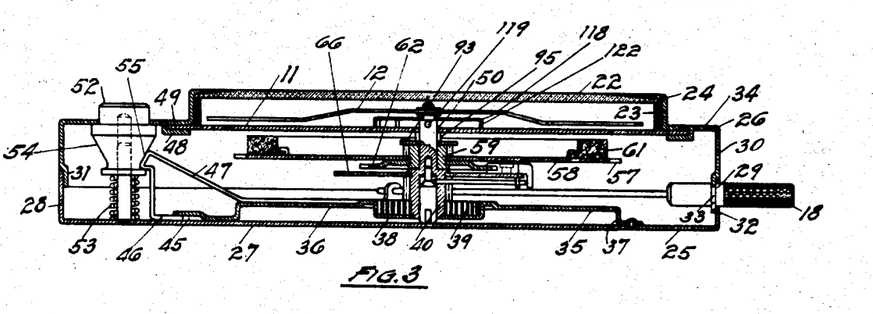
Fig. 3 is a sectional view on an enlarged scale on the line 3 3 of Fig. 1.
Figure 4:
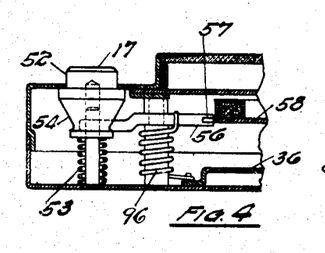
Fig. 4 is a fragmentary sectional view on the line 4 4 of Fig. 1.

As a detail, the dial and index are covered by a glass 22 held in place by an inner spacing ring 23 and an outer inclosing ring 24.

When the index has been brought to the fractional sub-division wanted, the handle is released, and the lower left hand pushbutton 16, which may be designated as the intermediate button, is depressed, and the mechanism operates to restore the index to the zero indication and at the same time brings into view in the lower opening 14, marked "Fractions" the fraction reading corresponding to that to which the index previously was brought. The result described follows from the first operation in the use of the devices, the zero reading continuing to be displayed, in the upper opening 15, marked "Inches."

As the operation described is repeated the fractions are added and the reading for the summation is indicated for the fractional part of such sum in the "Fractions" sight opening 14 and for the full inches in the "Inches" sight opening 15.

As the adding operation progresses the figure 21 in the "Inches" opening 15 moves along in the slot 15 until the full registered reading requires a change of a unit. When this occurs the first figure 21 is at the right of the initial position and the depressing of the intermediate button 16 operates to display the proper figure 21 at the initial position at the left of the slot 15.

In effecting the display of the "Inches" indication there is employed a cover plate 43 between the dial plate 11 and the figures 21 having a sight opening in registration with the slot 15 that operates to expose the proper figure 21 to indicate the totality of full inches.

After the entire summation has been completed and the reading obtained the final or restoring button 17 is pressed which serves to bring the entire mechanism back to zero.

As a detail the device is limited to a display of "8" in the inches display opening corresponding to a total summation of eight inches or simply eight regardless as to the unit.

Considering the constructive details, the base 10 is made of sheet material and is built up of two parts, respectively the bottom part 25 and the top part 26.

The bottom part 25 comprises a flat bottom 27 of square form and plain upwardly directed side walls 28 on the four sides that terminate at about the middle of the side wall structure of the complete base 10. The right side wall 28 has a hole 29 that is a fit for and serves as a bearing for the body portion of the handle 18.

The top part 26 has side walls 30 that are flush with the bottom side walls 28 for the exterior, exposed portion and which have at the lower edge portion inwardly off-set flanges 31 that telescope within the bottom side walls 28. The right flange 31 has a slot 32 that opens up from the bottom edge and that is a fit for and engages with a circular groove 33 in the periphery of the handle 18 and which serves to position the said handle 18 longitudinally. At the upper ends of the side walls 30 is the roof or top wall 34 that supports the dial plate 11 and glass 22 and is provided with suitable holes for the push-buttons 16 and 17.

In the lower part of the base or casing 10 is an intermediate plate 35, generally of circular form, whose body portion 36 is supported in spaced relation to the bottom 27 by means of annular flange portions 37 at the periphery that are secured to the said bottom 27. At the middle of the body portion 36 is a circular depression 38 that serves as a well for housing a spiral spring 39, which spring serves as the main spring, having the ends connected, one with the intermediate plate 35 and the other with the main shaft 40.

The bottom of the well 38 has a hole 41 the walls of which serve as a step bearing and also as a cylindrical bearing for the shouldered lower end portion 42 of the main shaft 40.

On the side of the intermediate button 16 is an extension of the flange 37 that coöperates with the opposed portion of the bottom 27 to form a channel 45 of suitable length and depth to operatively house the flange-like end 46 of a sliding member 47 of peculiar form, made of strip material, and which coöperates with the intermediate button 16 for effecting the functions of the said button which have already been mentioned and in a manner to be described.

The roof 34 is provided with an annular, depressed flange-seat 48 on which is seated the top plate 11 and above the latter is the flange-base 49 of the outer, inclosing ring 24 for the glass 22. The spacing ring 23 for the glass 22 rests on the top plate 11.

The top plate 11 is circular, has a central hole 50 for the main shaft 40, has around the exposed portion of the periphery the index markings 51, beginning with "0" at the left and extending around clock-wise, to correspond to graduations for fractions of sixty-fourths and multiples thereof, has the sight opening 14 on the lower side of the interior space and a marking for the same reading "Fractions," and on the upper side has the sight opening 15 of arcuate form and a marking for the same reading "Inches."

The intermediate or summation button 16 comprises the head 52 actuated by the spring 53, having at the lower portion a conical bearing surface 54 for coöperating with the correspondingly shaped nose 55 on the sliding member 47.

The final or restoring button 17 is of similar construction to the summation button 16, and its bearing surface 54 actuates the main pawl 56, the latter being held in operative position by the coil spring 96 and engaging normally with the toothed edge 57 of the main gear plate 58, and operating to check return movement thereof in the clockwise direction.

Figure 20:
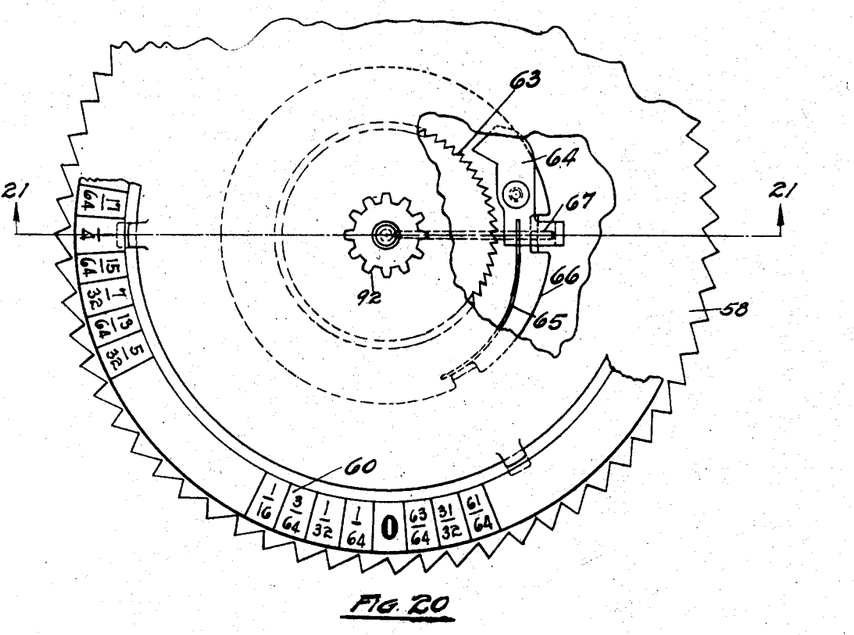
Fig. 20 is a plan view of the main ratchet gear or plate and adjacent parts.
Figure 21:
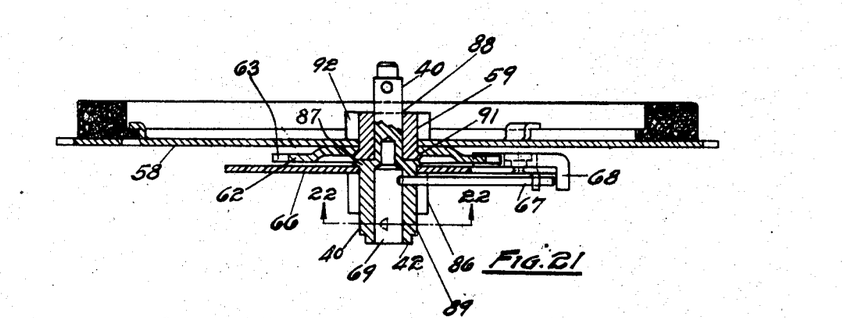
Fig. 21 is a sectional view on the line 21 21 of Fig. 19.
Figure 22:
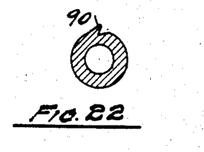
Fig. 22 is a sectional view on the line 22 22 of Fig. 21.

The said main gear plate 58 has the teeth 57 in the peripheral edge, is mounted indirectly on the main shaft 40 through the medium of a hub member 59, and has adjacent the said peripheral edge a set of markings 60, which latter as a matter of detail are provided on a ring 61 of fiber or other suitable material and mounted on the plate 58. The markings 60 correspond to the markings 51 on the top plate 11 generally, being however in reverse order and spaced relatively thereto by an angle of ninety degrees, and being, furthermore, in registration with the lower or fractional sight opening 14.

On the lower side of the main gear plate 58 is the auxiliary gear plate 62, of smaller diameter, and also mounted on the hub member 59, and having teeth 63 in the peripheral edge for coöperating with the pawl 64, the latter being operated normally so as to be in engaging position by the flat spring 65 and being operatively mounted on the pawl plate 66 that travels with the main shaft 40, and is released from the operating position by the thrust rod 67. The thrust rod 67 is positioned on the under side of pawl plate 66, being mounted in suitable bearings for longitudinal movement, and bears by its outer end against a downwardly hanging ear 68 on the pawl 64, the inner end thereof passing through the wall of the main shaft 40 and projecting into the open bore 69 provided in the lower portion of the said main shaft 40. A plug-like member 70 is operatively housed in the bore 69 so as to have a limited vertical movement, has a conical bearing surface 71 adjacent the upper end that coöperates with the said inner end of the thrust rod 67, being normally in the depressed position and serving when elevated to push the said thrust rod 67 outwardly so as to release the pawl 64. The plug 70 has at the lower end a cross slot 72 having an inclined top wall 73 that engages with the up-turned end 74 of the slide rod 75 so that when the said slide rod 75 is pulled to one side the plug 70 is raised and serves to actuate the thrust rod 67 in the manner described above.

The body portion of the slide rod 75 lays along the upper face of the bottom plate or wall 27 and at the outer end has a second up-turned end 76 that serves as the connecting member for making operative connection with the sliding member 47, already mentioned.

Figure 10:
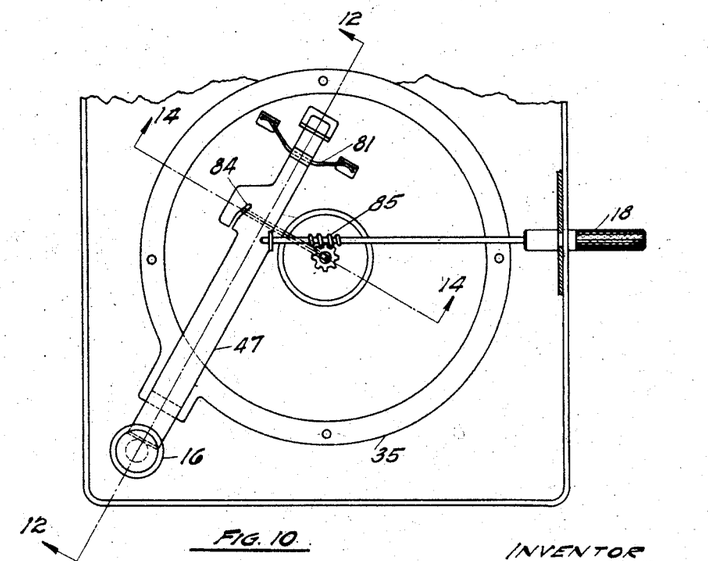
Fig. 10 is a plan view with the upper part of the mechanism removed, showing the handle structure with the worm and operatively connected parts.
Figure 11:
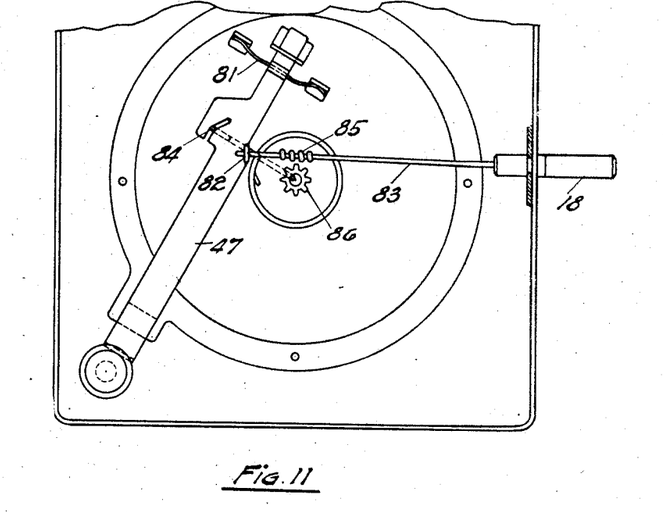
Fig. 11 is a similar view of the same parts when moved to a different position by depressing the intermediate push-button.
Figure 12:
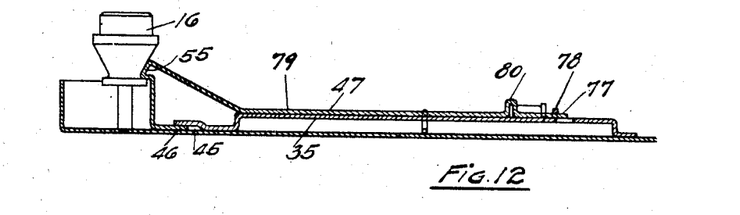
Fig. 12 is a sectional view on the line 12 12 of Fig. 10.

The said sliding member 47 is formed from an elongated piece of sheet material of uniform width for the greater part of the length and is slidably mounted on the upper face of the intermediate plate 35 by means of bearings provided for coöperating with the end portions thereof. The outer and lower end 46 is operatively housed in the channel 45, already mentioned, and is positioned adjacent the intermediate button 16. The other end 77 is engaged with a bearing 78 positioned generally on the other side of the axis from the said button 16. The body portion 79 extends along the plate 35, is provided adjacent the inner end 77 with an upturned portion 80 for making connection with a spring 81 that tends to drive the sliding member 47 toward the push-button 16.

At the outer end portion is the nose 55, already mentioned, for coöperating with the button 16, formed by suitably bending the material intermediate the body portion 79 and the outer end 46. Adjacent the axis is an up-turned ear 82 that is provided with a hole that serves as the bearing for the inner end of the handle rod 83 and on the lateral edge portion remote from the axis is a cam slot 84 for engaging with up-turned end 76 of sliding rod 75.

The handle rod 83 has the handle 18 mounted on the outer end and adjacent the axis is provided with a worm 85 for coöperating with the worm gear 86, the latter being either fixedly mounted on main shaft 40, or an integral part thereof.

The main shaft 40 comprises a lower part 87 at the lower end and an upper part 88 at the upper end. The lower part 87 is relatively enlarged, and at the junction of the two parts is an annular shoulder 91. The lower part 87 serves as a hub for the worm gear 86 and for the pawl plate 66, which is just above the said gear 86, and just below the gear 86 comprises a cylindrical portion 89 on which is mounted the spiral main spring 39. The inner end of the spring 39 is connected to the shaft 40, an integral prong 90 being provided on the periphery of the said cylindrical portion 89 for effecting such connection.

The bottom end portion 42 is formed to provide the shouldered bearing 42, already mentioned, for engaging with the bearing hole 41 in the intermediate plate 35 and serves as the lower bearing of the main shaft 40.

The upper reduced part 88 extends upwardly through the hole 50 in the top plate 11, the said hole 50 serving as the upper bearing for the main shaft 40.

The annular shoulder 91 at the junction of the lower enlarged part 87 and the upper reduced part 88 of the main shaft 40 serves as a seat for the hub member 59.

The said hub member 59 serves as the support for a gear 92, which may be integral therewith as shown, and at the lower end portion has an extension on which are rigidly mounted the main ratchet plate 58 adjacent the gear 92 and the auxiliary ratchet plate 62 just below the said gear 58, and at the upper end is positioned the driver or finger member 93 which is connected to the hub member 59 by the pin 94, as described.

The hub member 59 and the connected parts rotate as a unit on the upper reduced part 88 of the main shaft 40.

Fixedly secured to the rotating shaft 40 and positioned on the lower enlarged part 87 thereof, are the pawl plate 66, push rod 67, and one end of the main spring 39.

A spacing collar 95 is positioned between the finger member 93 and the top plate 11.

The mechanism described above may be designated as the main operating mechanism, and a brief description of the operation of the same is as follows:—

By turning the handle 18 to move the pointer or index 12 to the fraction desired the main shaft 40 is turned through the medium of the worm 85 and worm gear 86 and in opposition to the main spring 39, movement other than by turning the handle being prevented by reason of the worm connection; during such movement of the shaft the ratchet plate devices are locked against rotation by the stationary pawl 56 engaged with the teeth of the main ratchet plate 58, the traveling pawl 64 mounted on the pawl plate 66 being free from engagement with the teeth of the auxiliary ratchet plate 63. The intermediate button 16 is then depressed, effecting the engagement of the traveling pawl 64 with the auxiliary ratchet plate 63, permitting the main spring to return the shaft and pointer to the zero position, and carrying with the shaft for the full angular movement the ratchet plate mechanism, one feature of which results in the display in the lower sight opening 14 of the proper reading for the fraction to which the index was set at the time the button 16 was depressed. The intermediate button 16 is then released, effecting the release of the engagement of the pawl 64 and permitting the main spring to bring the pointer to zero.

I have now to consider the mechanism for effecting the indication for inches; the restoring mechanism; mechanism for limiting the entire range of movement; and mechanism for permitting a full 360 degree movement of the main shaft and pointer and preventing movement thereof in excess of the movement designated.

As a part of the ratchet plate unit that is rotatively mounted on the upper, reduced part 88 of the main shaft are two gears already mentioned, one the gear 92 that is integral therewith and the special, finger gear or driver 93.

Figures 13, 23:
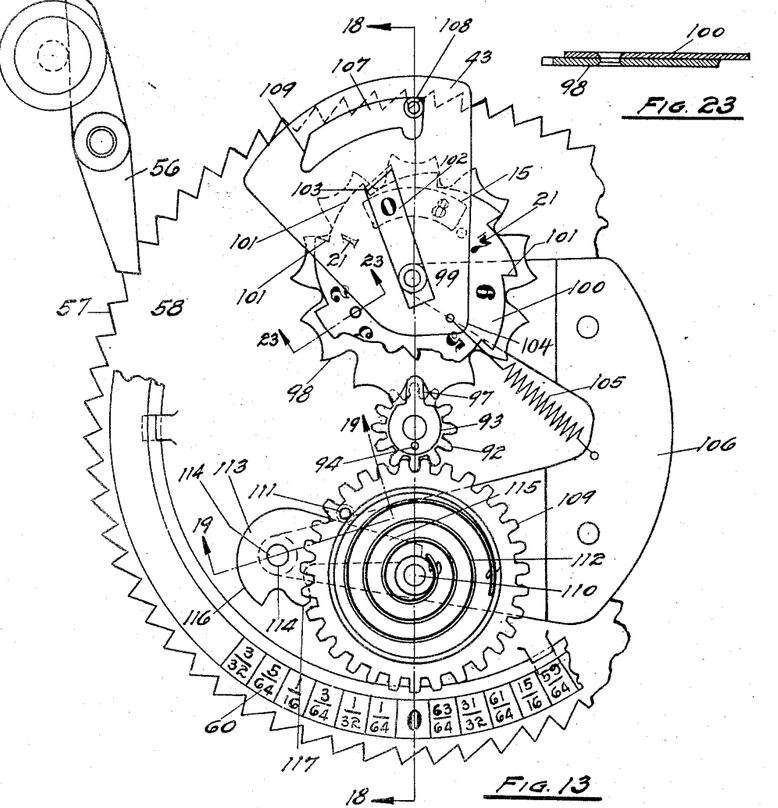
Fig. 13 is a plan view of certain parts of the interior mechanism, in part broken out, showing the main ratchet gear, the stop gear and connected parts.
Fig. 23, (Sheet 4), is a sectional view on the line 24 24 of Fig. 13.
Figure 14:
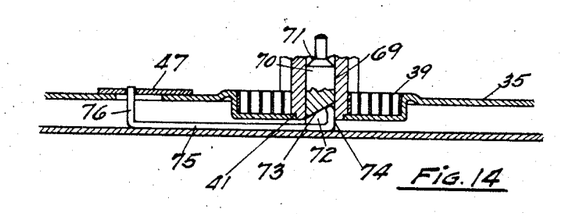
Fig. 14 is a sectional view on the line 14 14 of Fig. 10.
Figure 15:
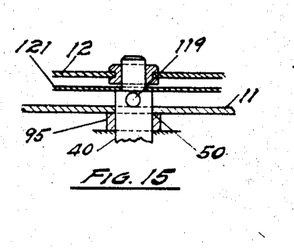
Fig. 15, (Sheet 1), is a fragmentary sectional view of the upper end of the main shaft.

The finger gear 93 is made of thin sheet material, has a hole that incloses the reduced shaft part 88, has the body portion secured to the hub 59 by the pin 94, and serves as a driving gear by means of the radial finger 97 that coöperates with a driven gear 98 of star-wheel form, and operative to effect a definite angular movement of the said driven gear or star-wheel 98 to correspond to one complete turn of the driving finger gear 93. The star-wheel 98 is mounted on the stub shaft 99, positioned on the upper, vertical radius of the general structure. Just above the star-wheel 98 and rigidly connected thereto is a special stop gear 100 having ratchet-like teeth 101 on the periphery, and that serves as the dial for the index, being provided on the upper face with the dial markings, already designated by the character 21, for indicating the inches, and in registration with the upper display opening 15.

The markings 21 extend from "0" to "8" inclusive, and the teeth on the star-wheel 98 and the stop gear 100 are nine in number to correspond to the said markings.

Above the special ratchet gear 100, and between the same and the top plate 11 is the cover or shutter plate 43, already mentioned, that serves to permit the display of the proper number 21 for inches in the sight opening 15 and to cover such other parts of the inches dial 21 as would otherwise be exposed in the said sight opening 15, which as has been mentioned, is in the form of a slot, the said cover or shutter plate being constructed and operated as follows: The general form of the plate is that of a sector, and it has a slot 102 extending radially along the inner body portion, that is a sliding fit for the stub shaft 99 which is positioned in the inner end portion thereof.

The slot 102 is also of the proper width to display a single inches dial number 21 and is extended outwardly a sufficient distance to cross the said dial 21. At the end of the slot 102 is a finger 103, formed by turning downwardly a portion of the sheet material removed to form the slot, that engages with the teeth 101 of the special stop gear 100, and is normally prevented from rotative movement by the said teeth.

A coil spring 105 is connected to the inner end 104 of the shutter plate 43 and tends to draw the same inwardly and also to rotate the same in a counter-clockwise direction, so as to hold the finger 103 in engagement with the teeth 101. The inner end of the coil spring 105 is connected to a construction plate 106 that serves as a part of the frame structure.

The teeth 101 are of saw-tooth form, comprising a radial or shoulder portion and an inclined or curvilinear portion, the finger 103 being held normally in engagement with the radial portion.

The change of engagement of the finger 103 from one tooth 101 to the other is effected in the following manner:—At the outer body portion of the shutter plate 43 is a cross-wise slot 107, generally of the arcuate form, in which is positioned the fixed pin 108.

The spring 105 holds the outer wall portion of the cross-wise slot 107 engaged with the pin 108, which wall portion is of curved form for the greater portion of the length and has an inclined cam portion 109 at the left end that operates in conjunction with the pin 108 to move the shutter-plate 43 outwardly bodily and thereby to free the finger 103 from engagement with the particular tooth 101 with which it happens to be engaged. This permits the spring 105 to swing the cover plate 43 around and draw the same inwardly so that the finger 103 will engage with the next tooth 101. Thus the next inches number 21 will be displayed through the slot 102 and the sight opening 15. The driving of the shutter plate 43 in opposition to the spring 105 is effected by the teeth 101 pushing against the finger 103, and the change from one tooth to the other is made to correspond with the proper reading for the summation.

The gear 93 drives the Geneva movement, which comprises the following mechanism:—The driven gear 109 meshes with the driving gear 93, the said gear 109 being mounted on the stub shaft 110, having on the upper face the stop pin 111, and being operatively connected with a spiral spring 112 that tends to rotate the same in a counter-clockwise direction.

The Geneva arm member 113 is pivotally mounted on a stub-shaft 114, positioned just outside of the gear 109, and comprises the stop arm 115 that is normally in the path of the stop pin 111 and bridges the space between the pivotal connection and the shaft 110 for the gear 109, suitably to stop rotative movement thereof, and thereby limit the movement of the auxiliary mechanism, that is operated by the spring 112.

Figure 16:
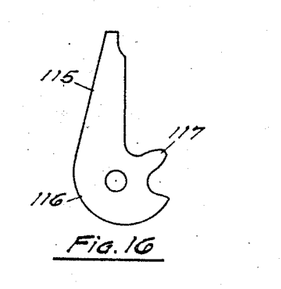
Fig. 16, (Sheet 3), is a plan view of the check or stop arm.
Figure 17:
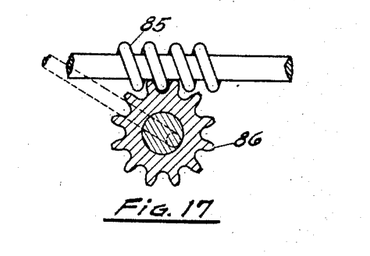
Fig. 17 is a sectional view of the worm gear, showing fragments of some of the adjacent parts.
Figure 18:
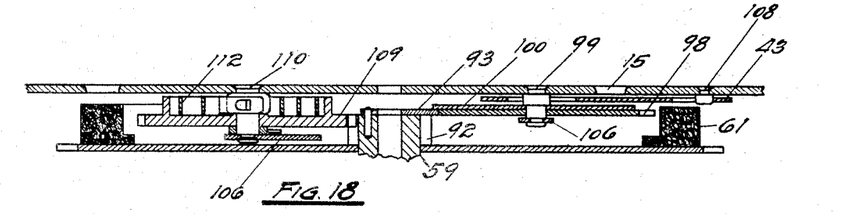
Fig. 18 is a sectional view on the line 18 18 of Fig. 13.
Figure 19:
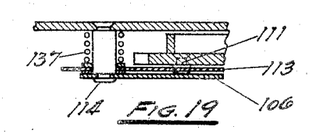
Fig. 19 is a fragmentary sectional view on the line 19 19 of Fig. 13.

The stop arm 115 merges on one side of the axis into the body portion, having the curved periphery 116 that is concentric with the axis, and intermediate the said body portion and the stop arm 115 on the other side of the axis is a single tooth 117. In use, as the main shaft is returned by the main spring on depressing the button 16 in connection with the mechanism that is locked with the said shaft and turned therewith is the gear 92, which operates the gear 109 in a clockwise direction. Thus the stop pin 111 is moved away from the normal position of contact with the rear edge of the stop arm 115 and is brought into contact with the front edge thereof and then pushes the stop arm 115 out of the way, thus bringing the tooth 117 in position for engagement with the stop pin 111 on the next turn. Thus as the turning is continued the tooth 117 is engaged and the arm structure is further turned, bringing the circular edge 116 in the path of the stop pin 111. Finally, as the turning is continued, corresponding to continued summation and registration or indication, the stop pin 111 is brought into engagement with the circumferential edge 116 and thereby checked against further movement, thus checking the entire structure.

As a detail, as the main spring unwinds it winds up the auxiliary spring 112.

The Geneva arm 113 is provided with a friction spring 137 to hold the same against accidental movement at the intermediate positions.

Figure 5:
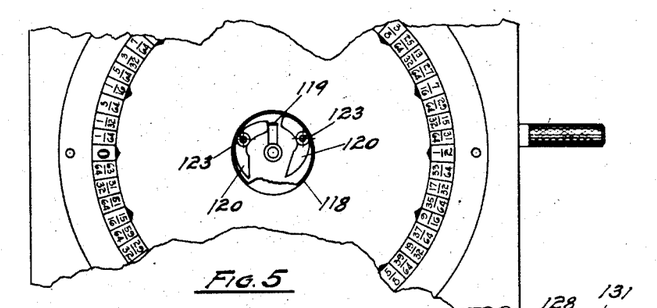
Fig. 5 is a plan view on the same scale as Fig. 1, in part broken away, with the outer cover devices and glass and also the index removed, the auxiliary cover being broken away to show the stop devices that are inclosed between the same and the top plate.

There remains to consider the means for stopping the main shaft, such means operating to permit one complete turn of the shaft in either direction and at the same time limiting such movement to just one turn, the said means being housed in an auxiliary cover 118, positioned on the upper face of the top plate 11, and comprising in coöperation with the said cover a pin 119 projecting radially from one side of the shaft 40, and a pair of cam-stops 120 of peculiar form.

The auxiliary cover 118 comprises a flat top wall 121 having a central hole by which it is loosely mounted on the shaft 40, just below the index 12, and a cylindrical side wall 122 that extends downwardly to the top plate 11. The said side wall 122 is opposed to the periphery of the cam-stops 120, and coöperates therewith to prevent displacement thereof in the different operative positions.

The cam stops 120 are elongated, generally crescent shaped structures, pivotally mounted adjacent the middle portion on pins 123, being preferably frictionally engaged with the pivotal pins 123. As shown, they have a radial slit 124 in one side and the pivotal hole is a tight fit for the pin 123.

The pivotal pins are positioned, one on each side of the axis, and just above the transverse diameter, assuming the normal position of the radial pin 119 to be upward and vertical.

The lower end portions 126 of the cam-stops 120 are pointed and are separated by a relatively wide open space 125 and the upper end portions 127 have radial or square ends 128 suitable for serving as stops in engagement with the radial pin 119 and are separated by a space 129 that corresponds closely to the thickness of the said radial pin 119.

The inner edges 130 are formed as cam faces for coöperating with the end face 131 of the radial pin 119 for effecting the proper positioning of the cam stops 119. The upper end portion 127, above the axis, serves essentially as a combined stop-arm and positioning arm and the lower end portion 126 serves as a tail for positioning only. The peripheries of the two arms 126 and 127 are individually finished concentric with the axis of the main shaft 40, but the upper stop arm 127 is bent inwardly relatively to the lower arm 126, so as to permit of bringing the end or nose portion 128 into position for stopping the rotative movement of the radial pin 119.

In use, as the radial pin 119 is swung from the lower open space 125 to one side or the other the end face 131 engages with the cam edge or face 130 of the first cam stop 120 that is in the path thereof and as the movement is continued it pushes the upper arm 127 out of the way, so that the movement in this particular direction is unimpeded until the vertical position is reached, when it abuts against the end 128 of the second cam-stop 120 on the other side of the axis. On reversing the movement the first mentioned cam-stop is swung to the engaging position so as to stop the movement after just one complete turn and during this movement the second cam stop is shifted to the non-stopping position. Thus the stopping of the rotative movement of the radial pin 119 and the shaft 40 is always effected with the pin positioned in the same position, regardless as to which one of the cam-stops 120 operated to effect such stopping. This result follows from the fact that in each case the stop nose 128 is set to one side of the normal position of the axis of the pin 119 to allow for the thickness of the material of the pin.

Figure 6:
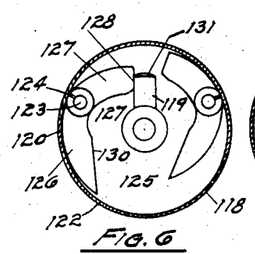
Figs. 6, 7, 8 and 9 are plan views, on an enlarged scale, of the stop mechanism shown in Fig. 5 in different positions, the cylindrical inclosing wall of the auxiliary cover being shown in section.
Figure 7:
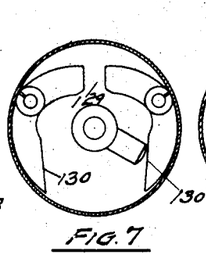
Figures 8, 9:
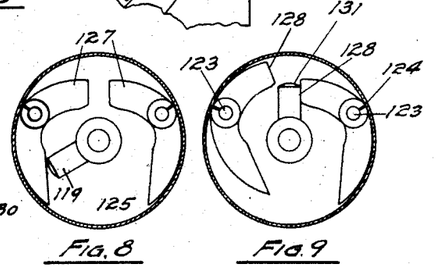

In Figs. 5 and 6 the radial pin 119 is shown in the normal or initial position, being engaged with the nose 128 of the left cam-stop 120, and free to complete one complete turn in the clockwise direction. In Fig. 7 the pin has been turned to move the right stop 120 to the engaging position by engaging with the lower tail or cam arm 126 thereof and the pin is entering the lower open space 125. In this position, the two noses 128 are opposed, and either of them is adapted to serve as the stop for stopping the pin. In Fig. 8 the pin is shown as about to engage with the left cam-stop 120 and as the movement is continued such engagement is effected, turning the same to one side, away from the stop position, and finally the pin is stopped in its original position, effecting one complete turn, being stopped however by the right nose 128.

The cylindrical wall 122 of the auxiliary cover 118 serves as a limiting or stop device for limiting the throw of the cam-stops 120 as they are swung back and forth by engaging with the periphery of the particular arm or branch, 126 or 127, that happens to be turned outwardly by the pin 119.

The stop mechanism described serves to compensate for the thickness of the material of the stop pin 119 and represents a practicable and operative means for attaining an ideal condition, as being the equivalent in the result obtained as would be obtained by the use of a moving stop or pointer without thickness that operates with either side of a single fixed stop that is represented by a point, without thickness.

The stop pin 119 serves to stop the return movement of the main shaft 40 and connected parts on pressing the intermediate or adding button 16 and also to limit the adding movement effected by the handle to one unit for each operation.

To return the indicating devices to the normal positions after the summation has been obtained the restoring button 17 is pressed, which releases the pawl 56 and the train of gearing held in check thereby, the actual return being effected by the auxiliary spring 112, and the final checking being effected by the coöperation of the stop pin 111, provided on the driven gear 109, and the stop arm 115. By having the stop arm 115 bridge the space between the shafts 114 and 110 in the final checking position a positive and firm stop is provided, one that is essentially free from lateral strain.

The star wheel 98 and single finger driver 93 are of the usual form for providing intermittent rotative movement of the special stop gear 100, whereby a relatively appreciable period of rest is obtained during which there is no movement of the inches index number 21 that is displayed in the upper sight opening 15.

In effecting the summation, turning the handle 18 serves to set the mechanism and pressing the intermediate button 16 serves to effect the proper registration or indication.

I claim as my invention:—

1. In a fraction adding machine, a casing having a display face provided with an opening of elongated form, a dial face having a set of numbers in registration with the said opening, and a shutter plate operative to reduce the portion on the said dial face that will be displayed through the said opening and means for positioning the said shutter plate comprising a fixed pin for coöperating with a slot in the said shutter plate.

2. In a fraction adding machine, a casing having a dial, a pointer, a shaft supporting the said pointer, a spring tending to rotate the said shaft in one direction, a handle for shifting the said pointer, and a worm and worm gear serving to connect the said handle and shaft.

3. In a fractional adding machine, a handle and a shaft, and a worm and worm gear serving to operatively connect the said handle and shaft, a spring tending to position the said shaft, and a push-button device for disconnecting the said worm and worm gear.

4. In a fraction adding machine, a handle, a shaft, a worm and worm gear connecting the said handle and shaft, a spring tending to position the said shaft, a fraction dial face device rotatively mounted on the said shaft, and a push-button operative when depressed to disconnect the said worm and worm gear and simultaneously to lock the said device to the said shaft.

5. In a fraction adding machine, a shaft, a pawl plate carried by the said shaft, a main ratchet plate mounted on the said shaft, and having indications on one face, and an auxiliary ratchet plate, connected to the said main ratchet plate, and a pawl on the said pawl plate for locking the said main ratchet plate to the said shaft by engaging with the said auxiliary ratchet plate.

6. In a fraction adding machine, a dial face having a sight opening for units, a shutter for covering part of the said opening, a dial having markings in registration with the said opening, a pivot for the said dial, the said shutter having a slot for receiving the said pivot, mechanism for moving the said dial, and means for changing the part of the said opening that is covered by the said shutter as the said dial is moved involving a rotative and a longitudinal movement of the said shutter relatively to the said pivot.

7. In a fraction adding machine, a unit composed of a star wheel and a special gear, dial markings on one face of the said special gear, a pivot for the said unit, driving means engaged with the said star wheel operative to rotate the said unit in effecting a change in display of the said markings, a shutter slidably and rotatively mounted on the said pivot, positioned so as to cover a section of the said markings generally and having a slot for the display of a single marking, having a lug for coöperating with the periphery of the said special gear, and having a cross-wise cam slot, a pin for coöperating with the said cam slot, and a positioning spring for the said shutter.

8. In a fraction adding machine, a handle operated device for effecting a setting of the adding mechanism comprising a main spring that is wound up in effecting the setting, registration mechanism that is operated by the unwinding of the said main spring comprising an auxiliary spring that is wound up during such operation, and means for locking the said registration mechanism in opposition to the said auxiliary spring.

9. In a fraction adding machine, registration mechanism comprising a rotating gear and stop mechanism comprising a second gear coöperating with the said first gear, and having a pin in one face, and a swinging arm for coöperating with the said pin for limiting the number of revolutions of the said second gear.

10. In a fraction adding machine, a spring operated restoring device comprising a gear, a pivot for the said gear, a spring connecting the said gear and pivot, and a stop device comprising a swinging arm, pivotally supported by one end, having the body portion extending across one face of the said gear, and abutting by its free end with the said pivot, and a pin on the said face of the gear for engaging with the said body portion.

11. In a fraction adding machine, a restoring spring, a gear connecting the said spring with the adding mechanism, a stop pin on one face of the said gear, and a stop device for coöperating with the said pin, the said stop device comprising a pivotally mounted member, having one portion in the path of the said pin in one position, having another portion in the path thereof in another position, and having means for being shifted from one of the said positions to the other as the said gear is rotated.

12. In a fraction adding machine, stop mechanism comprising a gear coöperating with the adding mechanism, a pivot for the said gear, a stop member, a pivot for the said stop member, a stop pin on one face of the said gear, a portion of the said stop member being operative as a gear in coöperation with the said pin for effecting a change in position of the said stop member, the body portion of the said stop member having a peripheral edge that in one position is in the path of the said pin so as to limit the movement thereof in one direction, and an arm on the said stop member serving in another position thereof to bridge the said pivots and to engage with the said pin so as to limit the movement thereof in the other direction.

13. In a fraction adding machine, a pointer rotatively mounted on a shaft and means that operate to permit of one complete revolution of the said pointer and shaft and prevent movement thereof beyond such one revolution.

14. In a fraction adding machine, a pointer supporting shaft having a radial stop arm and cam stop devices for coöperating with the said arm for limiting the rotative movement of the said shaft to a full 360 degree turn in one direction and a full return movement in the reverse direction.

CARLOS RUIZ.

Witnesses:
NORMAN L. SCHMIDT,
LOUIS M. SCHMIDT.